Patented Dec. 26, 1950

2,535,373

UNITED STATES PATENT OFFICE 2,535,373

MOLDED OBJECTS

Howard E. Shearer, Swarthmore, and Albert R. Martin, Springfield, Pa., assignors to American Viscose Corporation, Wilmington, Del., a corporation of Delaware No Drawing. Application November 8, 1944, Serial No. 562,568

1 Claim. (Cl. 18—48)

This invention relates to novel molded objects and to processes for producing them.

The molded objects of the invention comprise thermoplastic fibers which are molded at a controlled temperature below the melting point of the individual fibers as a whole so that the fibers are rendered plastic and softened but do not flow or lose their fiber structure, while simultaneously applying pressure thereto, so that the softened fibers are forced into very close proximity with each other, the distances therebetween approaching intermolecular distances. Under such conditions, the individual surfaces of the fibers are retained intact but adhere lightly to each other to form a seemingly continuous and substantially completely transparent or translucent mass in which the individual surfaces of the fibers are undiscernible under ordinary conditions, but in which the fibers are potentially revertible intact integrally with the molded object to a form in which the individual surfaces thereof are discernible under ordinary conditions.

The molded object may be maintained in the substantially completely transparent or translucent condition, or it may be treated, as by mechanical working, to restore the potentially revertible fibers to the form in which their surfaces are discernible under ordinary conditions, and such restoration may be effected at all points of the object or at pre-selected localized areas thereof.

In accordance with the invention, by appropriate mechanical working of the molded objects comprising the potentially revertible thermoplastic fibers, articles of pleasing and decorative appearance are obtained having all-over or "spot" designs imbedded therein which designs are an integral part of the molded article.

The molded article of fibrous mass may have any desired configuration. Thus, it may be in the form of a film, sheet or plate, or of a mat or bat of any desired thickness, ranging from extremely thin paper-like products to thicker mats or bats, and it may have any desired shape, such as disks or tubes, but in any case the article as initially obtained is substantially completely transparent or translucent throughout.

Prior to molding thereof, the fibers may be associated by means of carding and/or combing operations, or they may be blown into an enclosed space and permitted to settle out on a collecting belt or the like. Further, the fibers may be molded into tubes, rods, sheets, and the like by forcing a mass thereof through an extrusion molding device, or they may be molded in stationary molds. As an example, the fibers may be blown into a chamber and permitted to fall into a mold of the desired shape and size. The lay of the fibers in the molded article may be unidirectional, that is, substantially all of the fibers may extend roughly in one direction as for example generally parallel to the length of a film or mat, as occurs when the fibers are carded and/or combed; or they may be disposed heterogeneously throughout the mass or film with relatively few of the fibers arranged in parallelism, as happens, usually, when the fibers are blown together prior to collection thereof.

The fibers may be those obtained from such thermoplastic materials as cellulose acetate or other cellulose esters and ethers or mixed cellulose esters such as cellulose acetate-propionate, or cellulose acetate-butyrate, especially, in plasticized condition; also resins formed by the polymerization of various organic compounds including cumarone, indene hydrocarbons, vinyl compounds, styrene, sterol-aldehyde; phenol-aldehyde resins either unmodified or modified with oils; polyethylene; urea-aldehyde resins; amine-aldehyde resins such as melamine-aldehyde resins; polyhydric alcohol-polybasic acid resins; drying oil-modified alkyd resins; resins formed from acrylic acid, its homologues, and their derivatives; sulfur-olefine resins; resins formed from dicarboxylic acids and diamines (nylon type); synthetic or artificial rubber such as polymerized butadiene; olefine-polysulfides, e. g., "Thiokol"; isobutylene polymers; chloroprene polymers and polyvinyl halides, e. g., "Koroseal"; resins comprising the product of copolymerization of two or more resins such as, for example, copolymers of vinyl halide and vinyl acetate: also after-chlorinated copolymers of vinyl chloride and vinyl acetate; as well as mixtures of resins, such as a mixture of vinyl resins and acrylic acid resins, or methacrylic acid resins; a mixture of polyolefine resins and phenol-aldehyde resins; or a mixture of two or more resins from the different classes just named. There may also be employed fibers of rayon which have been rendered thermoplastic by treatment thereof with any of the foregoing materials or with other adhesive substances having an index of refraction similar to the above materials. Depending upon the particular thermoplastic material from which the fibers are formed, the molded mass is either substantially completely transparent or translucent.

The fiber forming material from which the fibers are obtained may contain added agents for obtaining special effects. For example, it may contain dyes, pigments, mothproofing agents, fire-proofing agents, water-proofing agents, etc. and in such cases the molded mass may be translucent. A plasticizing agent may be applied to the fibers and/or to the articles of the invention. The plasticizer may function to increase the flexibility of the fibers and, in addition, to lower the thermal softening point thereof.

The fibers may be pre-formed in any suitable manner, as by cutting previously formed continuous filaments obtained by conventional spinning or extrusion methods. If the character of the thermoplastic material is such that it is not adapted to the production of filaments by conventional methods, the fibers may be preformed by spraying the material while in flowable condition, that is, in solution, plastic, or molten condition, into a setting fluid, e. g., a liquid or gaseous atmosphere under sufficient pressure to form a multiplicity of fibers.

The temperature at which the fibers are molded depends upon the particular thermoplastic material from which the fibers are made. Since the materials are not homogenous, but consist essentially of a mixture of polymers having different molecular weights, the fibers do not have sharp melting points but melt over a relatively wide temperature range, embracing the temperature at which the polymer of lowest molecular weight melts, up to and including the melting point of the polymer having the highest molecular weight. For the purposes of this invention, the molding temperature is controlled so that the fibers are softened or rendered plastic and readily moldable, without melting or flowing. The molding temperature is below the melting point of the individual fibers as a whole, and, generally speaking, is in the neighborhood of the lower limit of the range between the melting points of the various polymers comprising the fibers. Preferably, the molded fibers are allowed to cool while under pressure so as to set and stabilize the fibers in the molded condition.

We have discovered that when the fibers are molded under the described conditions, the transformation of the fibers into a continuous transparent or translucent mass in which the fibers retain their individual surfaces intact, but which surfaces are undiscernible under ordinary conditions, is reversible, and the fibers can be restored intact and the surfaces thereof made discernible under ordinary conditions in the molded structure by subjecting it to mechanical working.

The following example is given to illustrate the invention.

*Example*

Staple fibers made from a copolymerization product of vinyl acetate and vinyl chloride, which had been subjected to a carding operation, were placed in a Carver press and heated to a temperature of between 80 to 90° C., while being subjected to a pressure of from 140 to 420 lbs./sq. inches. Prior to releasing the pressure, the product was cooled to about 50° C. A completely transparent continuous mass was obtained in which the fibers retained their individual surfaces intact but which surfaces were undiscernible under ordinary conditions. The product had an appearance similar to that of a film obtained by casting a solution of the copolymer. When the product was subjected to mechanical working, the individual fibers were found to be revertible to a form in which the individual surfaces thereof were discernible under ordinary conditions.

For purposes of comparison, similar carded mats comprising staple fibers of "Vinyon" were pressed at temperatures below 80° C. At such temperatures a completely transparent product was not obtained. When the mats were pressed at temperatures in excess of 90° C., the fibers were permanently and irreversibly fused together.

Fibers molded under the conditions set forth herein, may be caused to revert to a form in which their individual surfaces are discernible under ordinary conditions, in the molded article, by subjecting the latter to mechanical working as by means of flexing, abrading, turning, twisting, brushing, rubbing, or other operations, or by subjecting it to the action of delineating devices of various kinds. Novel and decorative effects may be achieved by causing the fibers to revert locally in any desired pattern or design, and such designs are imbedded in and an integral part of the molded mass. For example, the fibers may be caused to revert in the shape of designs depicting outdoor scenes or geographical areas, or they may be caused to revert in such a manner that the design imparted to the molded article comprises a series of parallel lines extending continuously entirely across the molded film or sheet, or, in the case of objects having rounded contours, about the circumference thereof, or such lines may have regularly or irregularly spaced interruptions. Similarly, reversion of the molded fibers the individual surfaces of which are retained intact but which are not discernible under ordinary conditions may be effected in such a manner that the design imbedded in the article comprises a plurality of sets of parallel lines each set intersecting with the other set or sets of parallel lines at any angles, such as right angles, 60°, etc., so as to form a plurality of adjoining squares, rectangles, triangles, or other geometrical shapes, throughout the area of the article. Also, the design may be such that the lines are entirely irregularly arranged throughout the area of the molded article, or the design may comprise regularly arranged lines occupying one portion of the article and either regularly or irregularly arranged lines or none at all occupying the remaining portion of the article. Furthermore, the design may comprise disconnected units regularly or irregularly arranged such as comparatively small dots, circles, squares, crosses, rectangles, ellipses, or shapes of irregular outline. Any of the foregoing or other designs may be imparted to the molded object by various means. One such method is to rub a suitably edged instrument across or around the article, or in pre-selected localized areas thereof, by hand, while the article is suitably supported. By flexing or twisting the molded transparent films or the like in all directions, the fibers at all portions thereof may be caused to revert to a condition in which their individual surfaces are discernible under ordinary conditions in an irregular manner, thus imparting an interesting modernistic effect to the article.

Films, mats or bats comprising the molded thermoplastic fibers the individual surfaces of which are retained intact but which are undiscernible under ordinary conditions may be employed with advantage as separators or retainers in storage batteries of the lead peroxide and other types, as well as in other electrolytic devices, such as electrolytic condensers. Such molded sheets or the like, for example, those prepared from fibers of copolymeric vinyl acetate and vinyl chloride, as well as those formed from fibers of other resins, particularly vinyl resins, combine the qualities of low electrical resistance, insolubility in corrosive electrolytes, resistance to swelling and distortion in such electrolytes, and a sufficiently high degree of acid porosity to render them highly suitable for use for the purposes indicated.

Products may also be produced in accordance with our invention which are adapted for use as a means of illustrating various theories relating to the science of optics, the phenomena of diffraction and reflection of light, the cause of opacity and transparency, the meaning of surface, etc.

After imparting the desired design or pattern to the molded article, the latter is treated to stabilize any remaining transparent or translucent portions thereof in order to render the fibers comprising such portions incapable of reversion to a form in which the individual surfaces thereof are discernible under ordinary conditions, thus preventing mutilation of the design due to further mechanical working of the article in use. This may be accomplished by subjecting the remaining transparent or translucent portions of the article to further heating to effect fusion of the fibers to permanently irreversible condition. For instance, such areas of the film or the like which are still transparent or translucent after mechanical working of the object, may be treated with a hot iron at temperatures above the melting point of the fibers, to cause the fibers to flow and fuse together. For example, in the case of films, mats or the like formed from fibers of a copolymer of vinyl acetate and vinyl halide, after imparting a design thereto at pre-selected portions or areas thereof, the portions of the article not involved in the pattern may be heated to temperatures in excess of 90° C. to convert the fibers comprising such portions to the permanently fused state.

Since changes may be made in practicing the above invention without departing from the spirit and scope thereof, it is to be understood that the foregoing description and specific example are illustrative only, and the invention is not to be limited except as defined by the appended claim.

We claim:

A method of making molded articles which are convertible by mechanical working from a condition in which the surfaces of the individual fibers are not discernible under ordinary conditions and the article has the appearance of a unitary transparent film to a condition in which the surfaces of the individual fibers in at least a portion of the article are discernible under ordinary conditions and the article has the appearance of a unitary film which is of greater light-reflective capacity and reduced light-transmitting capacity at the portion occupied by the fibers the surfaces of which are discernible under ordinary conditions than at any portion thereof occupied by fibers the surfaces of which are not discernible under ordinary conditions, the steps comprising providing fibers of a nonhomogeneous polymeric thermoplastic material consisting of a mixture of polymers having different molecular weights and softening temperatures, forming the polymeric fibers into a web, molding the web to desired predetermined shape by heating the fibers in the web to a temperature in the neighborhood of the lower limit of the range between the softening temperatures for the mixed polymers comprising the fibers to thereby soften the fibers, while subjecting the web to pressure such that the softened fibers are forced into close proximity to each other to produce a web in which the distances between the individual fibers approach intermolecular distances, cooling the web while retaining it under pressure to set the fibers in the molded condition, subjecting the transparent article thus obtained to mechanical working to convert at least some of the fibers to a condition in which the surfaces thereof are discernible under ordinary conditions, and fusing any fibers not so converted to permanently set them in a condition in which the surfaces thereof are not discernible under ordinary conditions.

HOWARD E. SHEARER.
ALBERT R. MARTIN.

REFERENCES CITED

The following references are of record in the file of this patent:

UNITED STATES PATENTS

| Number | Name | Date |
|---|---|---|
| 1,871,046 | Dickie | Aug. 9, 1932 |
| 2,031,636 | Dreyfus | Feb. 25, 1936 |
| 2,036,855 | Dickie | Apr. 7, 1936 |
| 2,041,760 | Harrison | May 26, 1936 |
| 2,044,135 | Taylor | June 16, 1936 |
| 2,050,286 | Dreyfus et al. | Aug. 11, 1936 |
| 2,072,926 | Taylor | Mar. 9, 1937 |
| 2,253,000 | Francis, Jr. | Aug. 19, 1941 |
| 2,277,049 | Reed | Mar. 24, 1942 |
| 2,324,838 | Horz et al. | July 20, 1943 |
| 2,335,757 | Hall | Nov. 30, 1943 |
| 2,357,392 | Francis, Jr. | Sept. 5, 1944 |
| 2,371,868 | Berg et al. | Mar. 20, 1945 |
| 2,381,142 | Stonehill | Aug. 7, 1945 |
| 2,433,727 | Arnold | Dec. 30, 1947 |